United States Patent
Okerlund et al.

(10) Patent No.: US 12,229,175 B2
(45) Date of Patent: Feb. 18, 2025

(54) LEGAL DOCUMENT SEARCH AND RANKING USING MACHINE LEARNING DURING LEGAL INTERACTIONS

(71) Applicant: Cloud Court, Inc., Minneapolis, MN (US)

(72) Inventors: Michael Okerlund, Minneapolis, MN (US); Milena Higgins, Minneapolis, MN (US)

(73) Assignee: Cloud Court, Inc., Minneapolis, MN (US)

(*) Notice: Subject to any disclaimer, the term of this patent is extended or adjusted under 35 U.S.C. 154(b) by 0 days.

(21) Appl. No.: 18/278,777

(22) PCT Filed: Feb. 28, 2022

(86) PCT No.: PCT/US2022/018198
§ 371 (c)(1),
(2) Date: Aug. 24, 2023

(87) PCT Pub. No.: WO2022/183125
PCT Pub. Date: Sep. 1, 2022

(65) Prior Publication Data
US 2024/0134895 A1  Apr. 25, 2024
US 2024/0232240 A9  Jul. 11, 2024

Related U.S. Application Data

(60) Provisional application No. 63/154,498, filed on Feb. 26, 2021.

(51) Int. Cl.
*G06F 7/00* (2006.01)
*G06F 3/16* (2006.01)
(Continued)

(52) U.S. Cl.
CPC ............ *G06F 16/334* (2019.01); *G06F 3/167* (2013.01); *G06F 16/38* (2019.01); *G06N 20/00* (2019.01);
(Continued)

(58) Field of Classification Search
CPC ........ G06F 16/334; G06F 16/38; G06F 3/167; G06N 20/00; G06Q 50/18; G10L 15/02; G10L 15/22; G10L 15/26; G10L 15/03
(Continued)

(56) References Cited

U.S. PATENT DOCUMENTS 6,055,531 A   4/2000 Bennett et al.
6,772,149 B1  8/2004 Morelock et al.
(Continued)

OTHER PUBLICATIONS

Ai et al., "Learning a Deep Listwise Context Model for Ranking Refinement," The 41st International ACM SIGIR Conference on Research & Development in Information, Jun. 2018, 135-144.
ICrowdLegal.com [online], "Cloud Court, Inc. Releases Armatus™, the Legal Industry's First SaaS Product Enabling Litigation Teams to Auto-search eDiscovery Documents as a Witness Is Testifying," Oct. 18, 2021, retrieved on Jun. 10, 2024, retrieved from URL <https://icrowdlegal.com/cloud-court-inc-releases-armatus-the-legal-industrys-first-saas-product-enabling-litigation-teams-to-auto-search-ediscovery-documents-as-a-witness-is-testifying/>, 5 pages.
(Continued)

*Primary Examiner* — Isaac M Woo
(74) *Attorney, Agent, or Firm* — Fish & Richardson P.C.

(57) ABSTRACT

Methods, computer systems, and apparatus, including computer programs encoded on computer storage media, for search and ranking legal document. The system obtains a transcript of a legal interaction, and displays the transcript via a user interface. The system further generates a query parameter based on the transcript, and transmits the query parameter to a database search engine. The system receives a list of documents retrieved by the database search engine corresponding to the query parameter, and for each document in the list of documents, generates a respective feature representation.

25 Claims, 10 Drawing Sheets

(51) Int. Cl.
  *G06F 16/38*  (2019.01)
  *G06N 20/00*  (2019.01)
  *G06Q 50/18*  (2012.01)
  *G10L 15/02*  (2006.01)
  *G10L 15/22*  (2006.01)
  *G10L 15/26*  (2006.01)
  *G10L 15/30*  (2013.01)

(52) U.S. Cl.
  CPC ............. *G06Q 50/18* (2013.01); *G10L 15/02* (2013.01); *G10L 15/22* (2013.01); *G10L 15/26* (2013.01); *G10L 15/30* (2013.01)

(58) Field of Classification Search
  USPC ........................................ 707/600–899, 728
  See application file for complete search history.

(56) References Cited

U.S. PATENT DOCUMENTS

2018/0315429 A1    11/2018   Taple et al.
2021/0073302 A1*   3/2021   Srinivasaraghavan ..................... G06F 40/205

OTHER PUBLICATIONS

International Search Report on Patentability in International Appln. No. PCT/US2022/018198, mailed on Jun. 23, 2022, 10 pages.
Keeling et al., "Using Machine Learning on Legal Matters: Paying Attention to the Data Behind the Curtain," Hastings Science and Technology Law Journal, 2020, 11(1):9-36.

* cited by examiner

ARMATUS 👤 John Doe ▾

Deposition Search

4  + Apply AI Modules   +Change Default Search Rules

Realtime Transcript

Loem ipsum dolar sit amet wef fttheth
sfgthjfhj ruyjkrfy,aserg.sq aergrtg tyh ete
we.ed tgrt ty D ftghhuj rtghhjowity. Uhdsg.
Nefsdvfasdfg oidfgmgihoppfghjfgy
Loem ipsum dolar sit amet wef fttheth
sfgthjfhj ruyjkrfy,aserg.sq aergrtg tyh ete
we.ed tgrt ty D ftghhuj rtghhjowity. Uhdsg.
Nefsdvfasdfg oidfgmgihoppfghjfgy
Loem ipsum dolar sit amet wef fttheth
sfgthjfhj ruyjkrfy,aserg.sq aergrtg tyh ete
we.ed tgrt ty D ftghhuj rtghhjowity. Uhdsg.
Nefsdvfasdfg oidfgmgihoppfghjfgy
Loem ipsum dolar sit amet wef fttheth
sfgthjfhj ruyjkrfy,aserg.sq aergrtg tyh ete
we.ed tgrt ty D ftghhuj rtghhjowity. Uhdsg.
Nefsdvfasdfg oidfgmgihoppfghjfgy Search Loem ipsum dolar sit amet 🔍

1. Loem ipsum dolar sit amet
   est bdge sdfed fooh acsc
2. Kniaedfuy zdfuyyw sdfh drger
3. Sarfg dfg jt fgb fyhjtytb gumjmm
4. Leoeir dcltynh kuiolu gftrgee
5. Loem ipsum dolar sit amet
6. Deeg fgukk see gukm, dfgg
7. Dwerg fyjt edfv jujik,uu,kui gbrf
8. Mwereg sefrty esrfyhyuk eertghtuyi yukukyet
9. Loem ipsum dolar sit amet Breakdown Results

| Email | 3,970 |
| Documents | 3,467 |
| Excel | 1,201 |
| Power Point | 898 |
| Publications | 769 |
| Other | 2,002 |

FIG. 1

Documentary Evidence

| | A | B | C | D |
|---|---|---|---|---|
| 1 | Discovery & Evidence Training Inputs | Motion Practice, Inter-party Communications, Hearings & Trials | Work Products | Additional & 3rd Party, and multi-category information |
| 2 | Written Discovery<br>• Interrogatory data<br>• Request to admit data<br>• Request for the production of documents<br>• Expert discovery (e.g., expert reports)<br>• Initial disclosures<br>• other | Motions Practice<br>Motions  ○ Summary Judgment<br>         ○ To compel<br>         ○ other<br>• Response briefs<br>• Reply briefs<br>• Sur-reply Briefs<br>• other | Communications between members of the case team<br>• Emails<br>• Memoranda<br>• Other | 3rd party data<br>• database of scientific works, papers, etc.<br>• other |
| 3 | Documentary Discovery<br>• Plaintiff's documents and data<br>• Defendant's documents and data<br>• 3rd Party documents and data<br>• Expert documents and data<br>• other | Communication between counsel<br>• Letters or emails between opposing counsel<br>• Meet and confer<br>• Settlement correspondence | Case / Litigation Management work product<br>• Work product generated from litigation services software packages | Evidence<br>• Any form. |
| 4 | Deposition discovery<br>• Plaintiff's deposition<br>• Defendant Depositions<br>• 3rd Party Depositions<br>• Expert Depositions<br>• other | Mediation Materials<br>• Statements and related materials | | Court Cases<br>• Case in related case types<br>• Cases in same jurisdiction<br>• Cases with the same judge<br>• Cases in related matters |
| 5 | Court evidentiary<br>• Findings of fact<br>• Judicial Notice<br>• other | Legal Proceedings Records<br>• Transcripts of hearings<br>• Transcripts of trials<br>• Oral arguments<br>• Others | | |

FIG. 3

| | A | B | C |
|---|---|---|---|
| | Evidence and information from previous cases | Evidence in this case | System Feedback: User |
| 1 | | | |
| 2 | • Evidence from previous cases<br>   o Differentiation between all evidence and evidence that was used as an exhibit at depositions or at trial, or which was referenced in motion practice or as otherwise differentiated as being of heightened importance in that former case. | Deposition content-<br>• Transcript from and deposition in the present case is monitored. A plurality of content from said deposition is used from said deposition is used to conduct searches of one or more connected databases housing discovery using one of key word, semantic or concept searching, DT searching, or other, and relevant documents, or other, and relevant documents are identified and used as training feedback to the system/ | Attorney input/feedback<br>• Documents referenced by an attorney in the same legal proceeding<br>• Indicia of usefulness / relevance provided by user<br>• Indicia of Usefulness/ irrelevance provided by user |
| 3 | | Content derived from deposition content | |
| 4 | | Exhibits utilized in depositions | |
| 5 | | Evidence cited in briefs | |

LEGAL DOCUMENT SEARCH AND RANKING USING MACHINE LEARNING DURING LEGAL INTERACTIONS

CROSS-REFERENCE TO RELATED APPLICATION

This application is a National Stage application under 35 U.S.C. § 371 of International Application No. PCT/US2022/018198, having an International Filing Date of Feb. 28, 2022, which claims priority to U.S. Provisional Patent Application No. 63/154,498, filed on Feb. 26, 2021, the disclosure of which is hereby incorporated by reference in its entirety.

BACKGROUND

Advances in data acquisition techniques and the decrease in costs associated with data storage have dramatically expanded the number of documents/data that are gathered, processed, and analyzed in the context of legal proceedings. Increasingly, legal professionals have turned to eDiscovery databases, and professional document review teams trained in their use, to assist in the management, analysis, and use of this data. As part of a litigator's preparation for questioning a witness, e.g., at a deposition or trial, litigators will typically prepare a list of questions or topics, and compile documents that are relevant to these topics, which are identified in advance by document review teams. However, witness testimony often strays into unanticipated areas for which the attorney is unprepared with relevant documents.

Currently, working on a document-dense litigation case after all those documents have been produced still requires highly skilled attorneys and legal staff. There has been little application of the above technologies beyond the document production step of the discovery phase of litigation. Depositions, for example, are still done with a deposition outline and a set of deposition exhibits that are carefully prepared ahead of time. When a witness states something that the attorney did not anticipate, it is often too difficult to search for additional documents that can be put in front of the witness during that very deposition. If the attorney did not anticipate a particular topic to come up during the deposition, it can be difficult to quickly identify documents and data (of portions of those documents) related to that unanticipated topic in a short amount of time. It would be beneficial to design a system that helped overcome these challenges.

For example, a system can use machine-learning models to automatically conduct searches for and perform ranking of legal documents during a testimony. The machine-learning models can include neural networks, other types of machine learning models, or both for various prediction tasks related to the document search. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on the input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification describes a system and associated methods that automatically conduct searches for and perform ranking of legal documents during a testimony. The system can be implemented as computer programs on one or more computers in one or more locations. In some implementations, the document search and ranking system uses machine learning to generate a list of relevant documents and/or respective ranking scores for the list of documents based on relevancy and importance.

For clarity, in this specification, a document can refer to an electronically stored collection of information in a predefined form. A database refers to a means for storing data and documents in an electronic format with a predefined data structure. A legal interaction can refer to a legal event, e.g., a trial or a deposition, during which speech may be recorded and/or transcribed.

In accordance with one or more aspects of the invention and corresponding disclosure thereof, various features are described in connection with utilizing the content of "real-time" speech, such as the speech of a deponent or witness or attorney uttered during (or in anticipation of) a legal proceeding. Said real-time speech, converted to (or recognized as) text using a speech-to-text module (STT Content), and is used as an input into a search for data (e.g., documents, files, etc.), including in an embodiment documents and data related to that STT Content, said data stored in one or more databases, such as an eDiscovery database.

A second feature described utilizes, in addition to STT Content, the content of one or more legal documents, including evidentiary documents (deposition transcripts, interrogatory responses, etc.) and/or non-evidentiary legal documents (such as work product, discovery requests) as an input into a search for data stored in a database (e.g., an eDiscovery database). In one embodiment, the search is used to identify data that is relevant to what a witness or participant is saying during a legal proceeding, such as a deposition or trial. Other databases containing information or documents potentially relevant to a legal proceeding may be searched as well.

A third feature described utilizes data and documents related to other litigation matters, including litigation matters that are related in some manner to a current legal proceeding (related because said cases address related areas of law, in one example) as an input into a search for data stored in a database.

The features of the disclosed systems and methods can include using machine-learning models, such as regression analysis, neural networks, decision trees, and support vector machines (SVM). In some implementations, the system uses the machine-learning models in combination with a search engine provided with a database product, for example, a search engine for performing search within one or more eDiscovery databases. These machine-learning models can include knowledge or rule-based components, sub-components, processes, means, methodologies, or mechanisms (e.g., fuzzy logic, data fusion engines, classifiers, and semantic or concept search, among others) ("DK Module(s)"). Such components, inter alia, can automate certain mechanisms or processes performed thereby to make portions of the systems and methods more adaptive as well as efficient and intelligent.

A feature of some implementations of the disclosed systems and methods utilize data described above, and/or data associated with one or more classes of litigation (e.g., intellectual property litigation, mass tort litigation, securities or antitrust litigation, class action or multi-district litigation), as input into a DK Module configured to evaluate the data inputs and utilize the evaluation results, in some embodiments in conjunction with STT Content to identify data/documents from a plurality of stored data/documents.

In one particular innovative aspect, this specification describes a method for performing document search and ranking. The method is implemented by a system including one or more computers. The system obtains a transcript of a legal interaction, and displays the transcript via a user interface. The system further generates a query parameter based on the transcript, and transmits the query parameter to a database search engine. The system receives a list of documents retrieved by the database search engine corresponding to the query parameter, and for each document in the list of documents, generates a respective feature representation. In this specification, a feature representation is an ordered collection of numeric values, e.g., a vector of floating-point or other numeric values, that has been determined to represent an entity, e.g., features of a document. The feature representation can characterize one or more properties of the document, such as size, type, image data, keywords, date, owner, and so on. The system processes the feature representations of the list of documents to generate a ranking result.

In some implementations, to obtain and display the transcript during the legal interaction, the system obtains the transcript based on an audio signal obtained during the legal interaction in real time, and displays the transcript via the user interface during the legal interaction in real time.

In some implementations, to obtain the transcript based on a speech made during the legal interaction in real time, the system performs a speech-to-text conversion to generate the transcript from the audio signal. In some implementations, the accuracy of the speech-to-text conversation may be augmented through the submission of words, proper names, terms, etc., that are anticipated to be vocalized during speech, especially in instances where the terms are uncommonly used or where speech-to-text modules do not accurately differentiate the term actually spoken from similar, often more common, terms.

In some implementations, the accuracy of the speech-to-text conversation is augmented through human error identification feedback to the speech-to-text module, such feedback occurring, for example, "live" during the speech itself though the human identification and correction of mistranslations, or though error identification and correction performed after the conclusion of the speech. In the case of the former, live identification and correction of errors may be utilized as a feedback input into the speech-to-text module, thereby lessening the occurrence of similar errors during the remain legal interaction.

In some implementations, to generate the query parameter based on the input, the system receives, from the user interface, a first user input that indicates a transcript element in the transcript, and generates the query parameter based on the transcript element in the transcript. For example, the transcript element can include a keyword. In another example, the transcript element can specify a particular portion of the transcript.

In some implementations, the system further displays the transcript element, receives a second user input that indicates modifications to the transcript element, and modifies the transcript element based on the second user input.

In some implementations, to generate the query parameter based on the transcript, the system processes a first input including at least a portion of the transcript using a first machine learning model to generate the query parameter. The system can further obtain contextual information of the legal interaction, and include the contextual information in the first input to the first machine learning model.

The contextual information of the legal interaction can include one or more of: an intended target of a testimony deponent information case type information of the legal interaction or judge information of the legal interaction.

Alternatively, in some implementations, the system generates the query parameter without using any user inputs that indicate keywords.

In some implementations, to generate the respective feature representation for the document, the system processes a second input using a second machine learning model to generate the feature representation. The second input can include document information of the document. The document information can include one or more of: a file type of the document, metadata fields associated with the document or file type, a file size of the document, image data in the document, audio data in the document, a ratio of image data to text in the document, a page number of the document, text conversion quality in the document, a scan resolution of the document, a document age of the document, a document source of the document, or whether the document was involved in prior litigation. The second input can further include a portion of the contextual information of the legal interaction.

In some implementations, to process the feature representations of the list of documents to generate a ranking result, the system generates a respective ranking score for each of the list of the documents; and ranks the list of documents according to the respective ranking scores of the list of documents.

In some implementations, to process the feature representations of the list of documents to generate a ranking result, the system defines a finite set of relevancy categories; and assigns each document into one of the set of relevancy categories.

In some implementations, to process the feature representations of the list of documents to generate a ranking result, the system processes an input including one of the feature representations using a machine learning model to generate a portion of the ranking result. The machine learning model can include a set of category-specific machine learning models, and the system can determine a category of the document, select one of the set category-specific machine learning models according to the determined category of the document, and process the input including the feature representation of the document using the selected category-specific machine learning model to generate a portion of the ranking result.

In some implementations, before using a machine learning model to generate the output, the system described above or another system further obtain training data, and performs training to update model parameters of the machine learning model.

The machine learning model can include one or more of: a first machine learning model for processing a first input to generate the query parameter; a second machine learning model for processing a second input to generate the feature representation for each document in the list of documents; or a third machine learning model for processing a third input to generate a portion of the ranking result.

The training data can include a plurality of training examples obtained based on one or more of: data indicating contents in a court opinion; court filings by a party; an evidentiary legal document; a non-evidentiary legal document; a testimony document; a work product; or data or documents associated with related cases.

When performing training to update the model parameters of the machine learning model, the system can perform end-to-end training of the first, the second, and the third machine learning models on the training data.

In some implementations, the training data includes a set of query training examples. Each query training example includes a training input transcript and an output label including a query parameter. To perform training to update the model parameters of the machine learning model, the system performs training of the first machine learning model on the query training examples. The query training examples can be generated based on a user input indicating keywords of the training input transcript.

This specification also provides a system including one or more computers and one or more storage devices storing instructions that when executed by the one or more computers, cause the one or more computers to perform the scene transition prediction method above.

This specification also provides one or more computer storage media storing instructions that when executed by one or more computers, cause the one or more computers to perform the scene transition prediction method described above.

The subject matter described in this specification can be implemented in particular embodiments so as to realize one or more of the advantages. For example, the described system can provide automatic and real-time guidance for providing and selecting documents relevant in a legal interaction.

BRIEF DESCRIPTION OF THE DRAWINGS

FIG. 1 illustrates an example user interface.

FIG. 3 illustrates examples of types of data used in the document search and ranking system.

FIG. 4 illustrates other examples of types of data used in the document search and ranking system.

Figure 9:
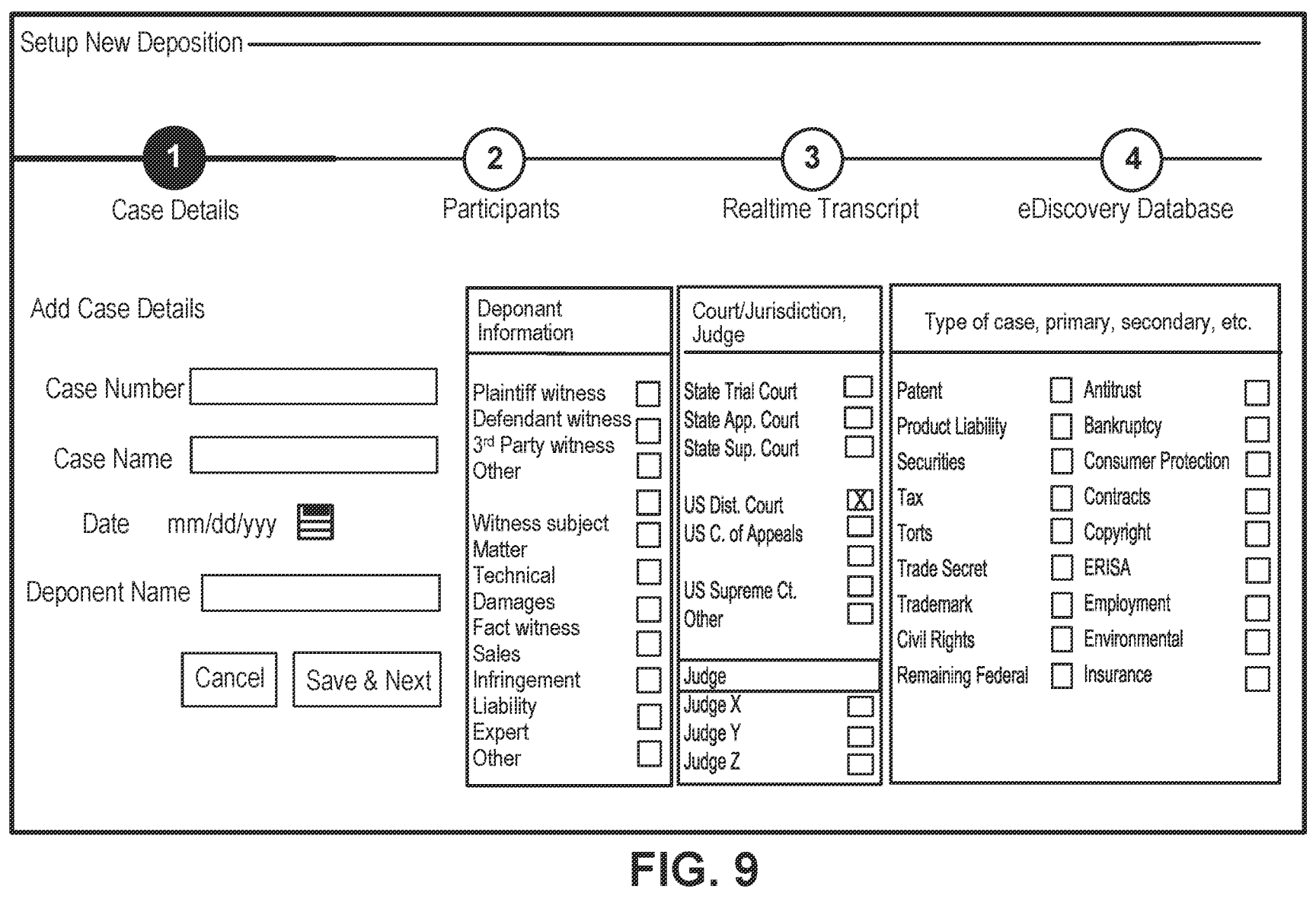

FIG. 9 shows an example of an interface for specifying the contextual information.

Like reference numbers and designations in the various drawings indicate like elements.

DETAILED DESORPTION

Figure 2:
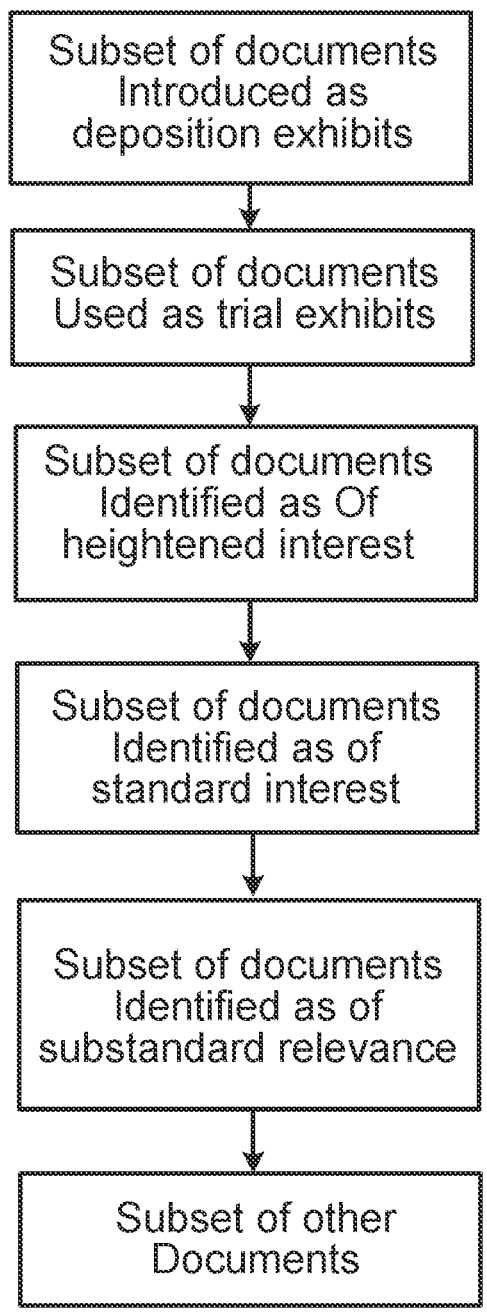
FIG. 2 illustrates examples of documentary evidences.

This specification describes a system and associated methods that automatically conduct searches for and perform ranking of legal documents in conjunction with testimony. The system can be implemented as computer programs on one or more computers in one or more locations. In some implementations, the document search and ranking system uses machine learning to generate a list of relevant documents and/or respective ranking scores for the list of documents based on relevancy and importance.

In some implementations, the document search and ranking system uses speech of a deponent or witness, converts or otherwise recognizes the content of that speech "as speech" or recognizes it as having meaning, and then utilizes a subset of that converted speech (such as a word or a phrase or a paragraph) as an input into a search query to identify documents stored in one or more remote databases, such as eDiscovery databases, with the system identifying and displaying documents and data likely to be useful to an attorney for the purposes of questioning or defending a witness, as an example. The system can identify documents and data based on machine-learning models. The system can further generate training examples based on inputs and feedback, including user feedback, and learn a set of model parameters of the machine-learning models by performing training based on the training examples. An exemplar GUI provided by the system is set forth in FIG. 1. Speech events attributable to a witness and/or one or more additional participants, such as attorneys for parties in a litigation matter, is captured and converted to text utilizing a human transcriptionist or an automated speech-to-text module.

After being generated, a transcript of speech is displayed to a participant using a graphical user interface, such as depicted in FIG. 1. In some implementations, a transcript of speech is displayed using a graphical interface and errors in translation are identified and corrected by a reviewer, providing feedback to a speech-to-text or translation module so that data obtained from those errors may be utilized as near real-time feedback to improve the accuracy of the translation during the same and/or future sessions.

Once the transcript is generated, certain implementations of the system can receive a user input to designate one or more sub-portions of the transcript, and utilize that content as an input into searches of one or more databases, such as an eDiscovery database. For example, the system can receive user input to highlight or otherwise designate portions of the transcript text, and generate database query parameters that include keywords and optionally other search parameters according to the user input. The system can display the database queries on the GUI, and optionally receive further user adjustments to the query parameters. Subsequently, the system can submit the database query parameters to a database search engine, and receive the database search result from the search engine. The retrieved database result can include a list of documents. The system can then perform a ranking operation on the list of retrieved documents. For example, the system can assign a ranking score to each of the list of retrieved documents according to document relevancy, importance, and/or usefulness to a participant of the legal proceeding, such as a questioning attorney, and display the list of documents in a sorted order in the GUI according to the ranking score.

Figure 7:
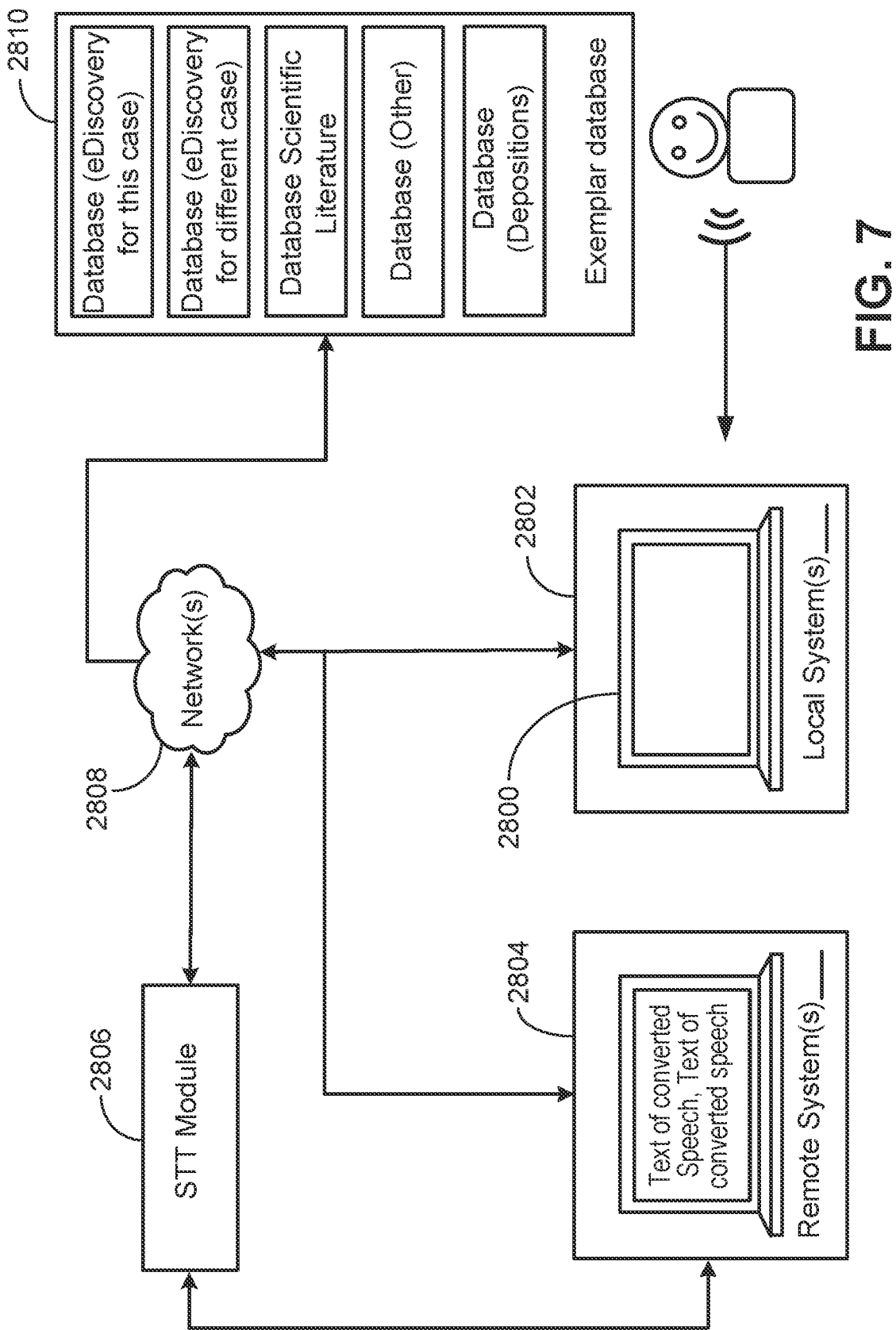
FIG. 7 illustrates a process of the system connecting to the databases, submitting database search queries, and retrieve search results from the databases.

In certain implementations, the system directly utilizes content of the transcript without needing to be selected by the user, and that content is then utilized as an input into searches of one or more remote databases such as eDiscovery databases. For example, the system can process the transcript using a machine learning model, e.g., a neural network, that predicts queries that are derived from text of the transcript and that are likely to be of interest. FIG. 7 illustrates a process of the system connecting to the databases, submitting database search queries, and retrieve search results from the databases. The system can be configured to connect to any database or repository of information, whether stored locally or remotely or a combination of the two. The local system 2802 can include a microphone 2800. The local system 2802 and a remote system 2804 can communicate with the STT module 2906 and the databases 2810 via a network 2808.

As will be recognized by one of skill in the art, databases may be configured in many ways, and the data stored within may be prepared, tagged, transformed, indexed and searched using numerous methods. The type of search that can be executed using any particular database will depend in part on the configuration and capabilities of the database, some databases having been pre-configured to support key word searches, others configured to search for conceptually or semantically related content (as examples) or searched using metadata that is related to the content of the real time speech of a deponent during a legal proceeding, such as a deposition, deposition preparation session, or court room testimony, as examples. The system may be configured to link to any compatible database using any known method of preparation or indexing. The benefit of such a system is that it can identify from a much larger data set, data and documents that are more likely to be relevant to what a witness is stating during a live deposition or legal proceeding and display that data/document via a GUI to a participant in that deposition, such as a questioning attorney.

In certain implementations, the data/documents so identified are linked to the witness in some manner (e.g., the witness having authored the document or edited the document or received the document in the past, as recognized via any means (for example) via metadata).

In certain implementations, the data so identified is ordered or triaged via one or more of a plurality of criteria. By example and not limitation, such criteria include predictive criteria, relevance, time criteria, document type, document source, or the relation of that document to one or more individuals.

Figure 8:
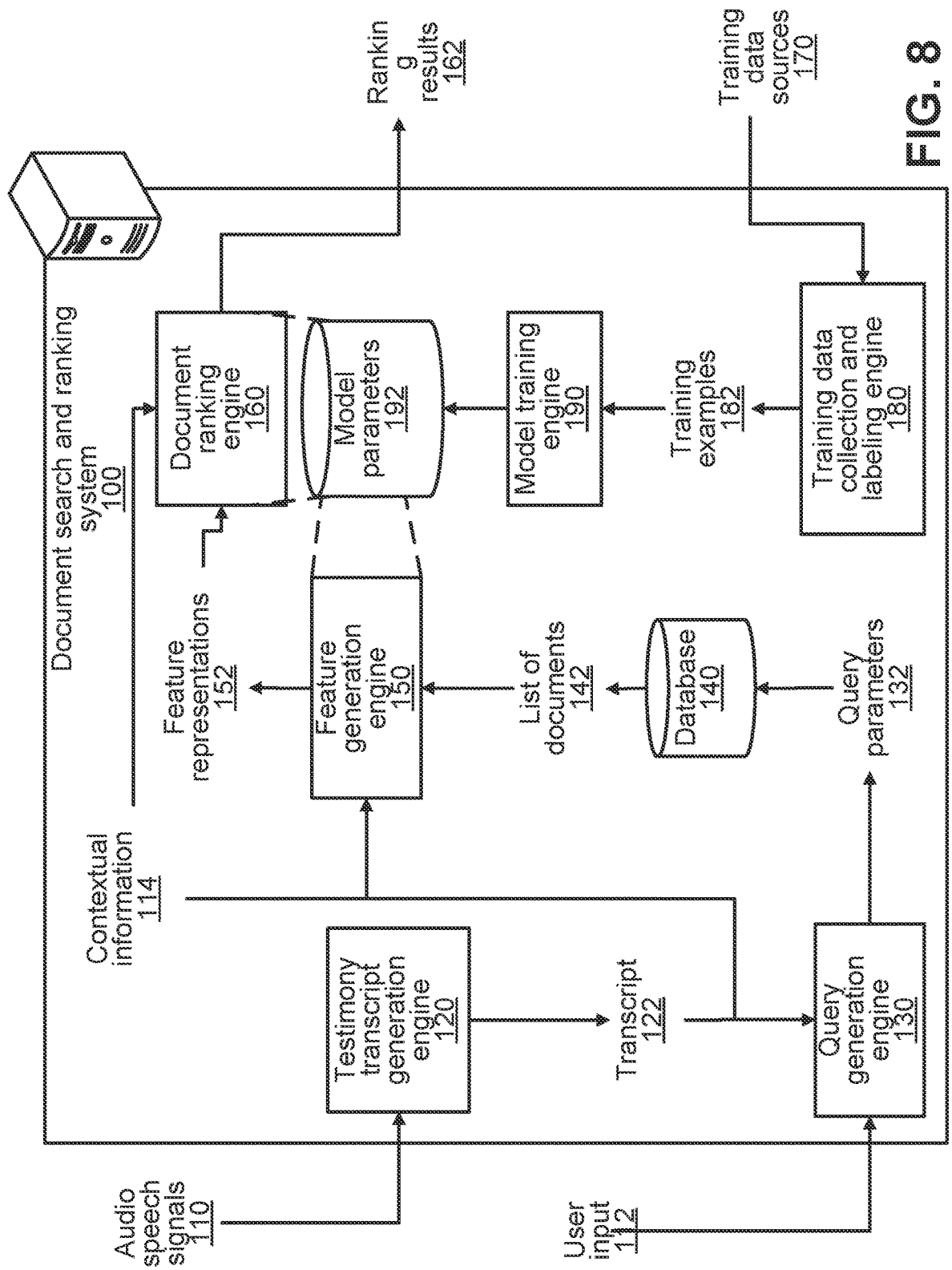
FIG. 8 shows an example of a document search and ranking system.

FIG. 8 shows an example of a document search and ranking system 100. The system includes a testimony transcript generation engine 120, a query generation engine 130, a feature generation engine 150, and a document ranking engine 160. The system 100 can further include a training data collection and labeling engine 180 and a model training engine 190.

The testimony transcript generation engine 120 takes an input of audio speech signals 110 collected during a legal interaction, and generates a transcript 122 of a testimony in real time. The legal interaction can include a testimony being given, e.g., at trial or during a deposition, or an argument being presented at trial, e.g., by the opposing attorney.

Based on the transcript 122, the query generation engine generates query parameters 132 for a document search in one or more specified databases 140, such as one or more eDiscovery databases.

In certain implementations, the query generation engine 130 receives additional user input 112 after the transcript has been generated. For example, the query generation engine receives user highlighting on certain portions of the transcripts, and uses the highlighted or otherwise designated portion as search key phrases included in the generated query parameters.

In certain implementations, the query generation engine 130 includes a query model that uses the transcript itself as input to predict the query parameters, or to supplement or refine query parameters generated based on the additional user input. In an example, the query model may transform the transcript text to "a bag of words", and calculate a feature representation from the bag of words to extract relevant key words. Various techniques, such as N-gram statistics, term frequency-inverse document frequency, and Rapid Automatic Keyword Extraction can be used in the key word extraction.

In certain implementations, the query model includes a learnable model such as a neural network. The system 100 can generate model parameters for the query model using training data. For example, the training data can include training examples with the user input (such as highlighting or keyword inputs) as feedback. In certain implementations, the query model can be trained end-to-end with additional models in the feature generation engine and ranking engines based on performance feedback for the ranking results.

Figure 10:
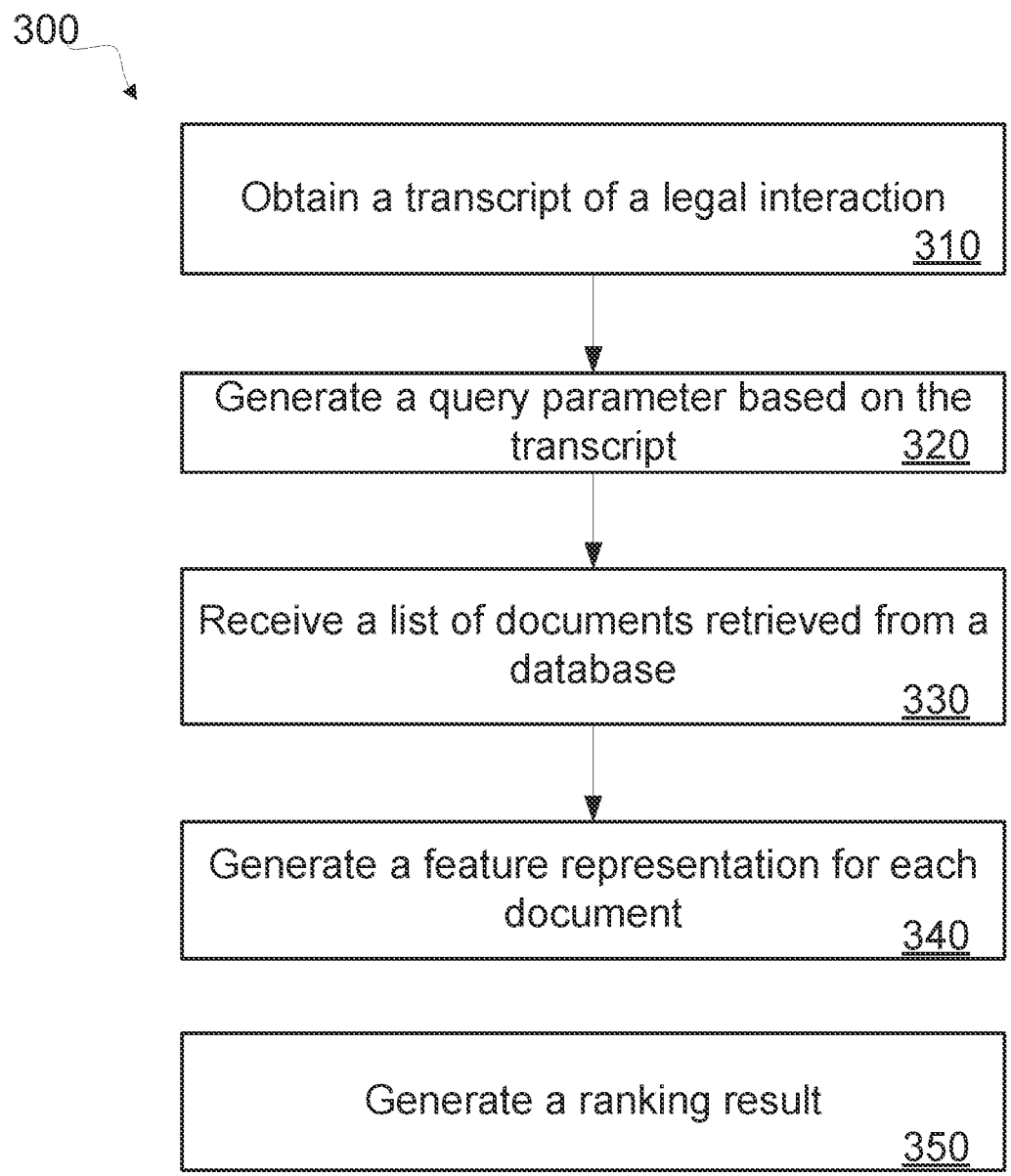
FIG. 10 shows an example process for document search and ranking.

The query model can take additional contextual information 114 as input, such as the intended target of testimony (e.g., for the plaintiff, defense, or a third party), the type of the deponent (e.g., expert, fact witness, damages, or liability), the court information, the judge information, the type of the case (patent, securities, or antitrust). FIG. 10 shows an example of an interface for specifying some of the contextual information.

After sending the query parameters 132 to a search engine performing the specified search in the databases, the system 100 receives a list of documents retrieved by the database search engine. The feature generation engine then processes each of the list of documents, and optionally processes the contextual information, to generate feature representations for each of the documents.

In some implementations, the input data of the feature generation engine 150 includes information about each of the documents, such as one or more of: quantitative and qualitative characteristics of the document, file type, presence or absence of classes of metadata, size of the file, presence or absence of image data, presence of absence of audio data, ratio of image data to text, page numbers, information density in the document, document DPI/scan resolution, document age, document source, or whether the document was involved in prior litigation.

The input data of the feature generation engine can further include one or more items in the contextual information 114. And in addition, the input data can include the document contents.

In some implementations, the feature generation engine 150 includes a feature extraction model that processes the input data to generate a feature vector for each document. The feature vector encodes important features in the input data. The feature extraction model can be a learnable model such as a regression model or a neural network, and can be trained concurrently with the models in the document ranking engine based on the performance feedback of the system.

After generating the feature representations, the ranking engine 160 processes the feature representations 152 of the list of documents to produce a ranking result. The ranking result can include a normalized ranking score for each of the list of the documents. In an example, the ranking engine can define a finite set of relevancy categories, and assign each document into one of the categories. In another example, the ranking engine can regress a ranking score for each document and rank them according to the scores. The ranking engine includes a ranking model that processes the feature representations into the ranking results. The ranking various methods can be used for implementing the ranking model, such as staged logistic regression, ranking SVM, RankNet, adaptive ranking using a neural network as a comparator, and policy learning using neural networks.

In certain implementations, the ranking model receives feature representations for all of the documents in the repository and generates ranking results for all of the documents in the list. Alternatively, the ranking model includes multiple category-specific ranking models, and each ranking model processes the feature representations of a single type of documents to generate a category-specific ranking result. The system optionally combines the category-specific ranking results to generate an overall ranking using a combination model, or ranks the documents directly based on the category-specific ranking result. The category-specific ranking models can be trained using training examples within the same category.

In certain other implementations, the ranking model receives feature representations of top candidates as identified by a conventional search engine, and processes the candidate feature representations to output ranking results for the top candidate.

The search and ranking system further includes a model training engine that generates model parameters for one or more learnable models in the query generation engine, the feature generation engine, and the document ranking engine. The training engine uses training examples generated by the training data collection and labeling engine.

The training data collection and labeling engine collects data from one or more data sources. In one example, the system can utilize information and feedback from prior cases as training data. In a training example generated for a prior legal proceeding, the system collects the transcript, user input, and contextual information to be used as input of the models. The system further collects user feedback regarding a displayed list of documents, such as which documents in the list have been selected by the user for access and/or a relevancy score inputted by the user for each of the displayed documents. The user feedback can further include an overall outcome rating for using the documents selected by the user. The training data collection and labeling engine processes the feedback to generate corresponding labels to the list of documents. The labels can include, for example, a normalized ranking score for the document according to the user feedback.

FIG. 10 shows a flow diagram illustrating an example process 300 for document search and ranking. For convenience, the process 300 will be described as being performed by a system of one or more computers located in one or more locations. For example, a document search and ranking system, e.g., the system 100 of FIG. 8, appropriately programmed in accordance with this specification, can perform the process 300.

In step 310, the system obtains a transcript of a legal interaction. The system can display the transcript via a user interface. In step 320, the system generates a query parameter based on the transcript, and transmits the query parameter to a database search engine. In step 330, the system receives a list of documents retrieved by the database search engine corresponding to the query parameter. In step 340, for each document in the list of documents, the system generates a respective feature representation. In step 350, the system processes the feature representations of the list of documents to generate a ranking result. The system can display one or more of the documents according to the ranking result.

Additional information regarding the data sources and training data collection and labeling will be described in a later portion of the documents.

Figure 5:
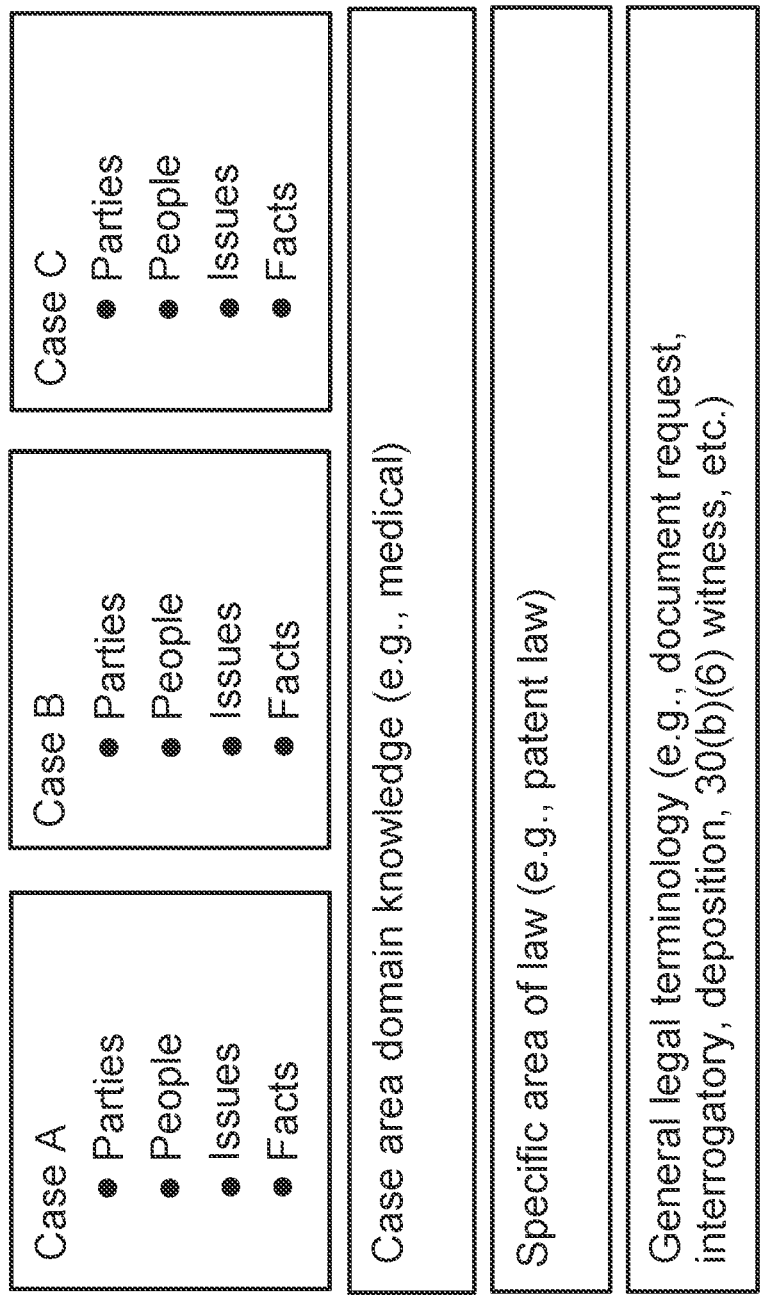
FIG. 5 illustrates other examples of types of data used in the document search and ranking system.
Figure 6:
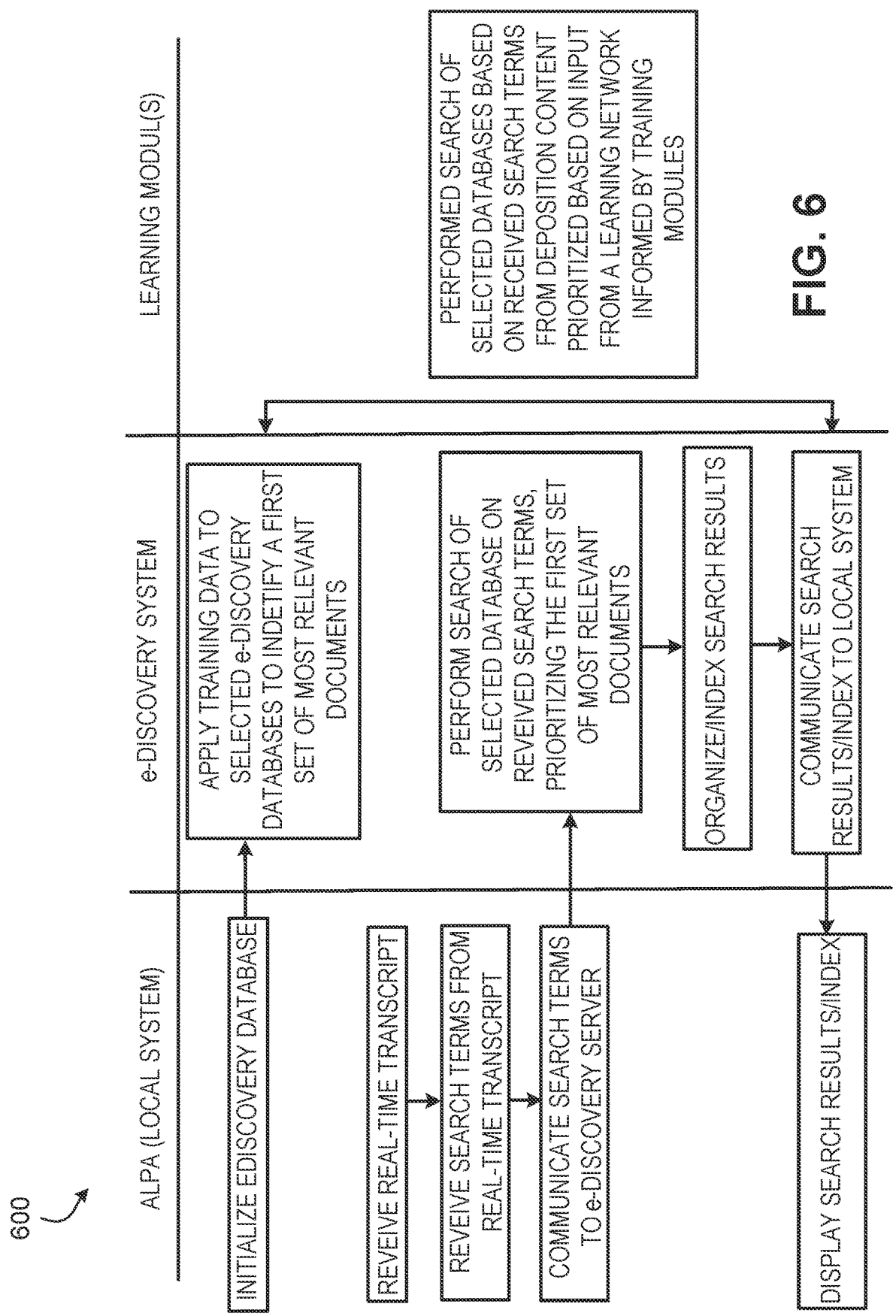
FIG. 6 illustrates modules of an example document search and ranking system.

Additional features of the search and ranking system will be described below with reference to FIGS. 2-6. FIG. 2 illustrates examples of documentary evidences 200. FIG. 3 illustrates examples of types of data used in the document search and ranking system. FIG. 4 illustrates other examples of types of data used in the document search and ranking system. FIG. 5 illustrates other examples of types of data used in the document search and ranking system. FIG. 6 illustrates modules of an example document search and ranking system 600.

A feature of the system is related to training predictive modules, over time, to more accurately identify documents useful to a user of the system (such as an attorney) that have been identified based in part on what a witness is stating in real time. In one embodiment DK Modules can be, by way of example and not of limitation, "general-purpose" modules (i.e., modules having as training input information from a plurality of case types); "matter specific" modules (i.e., modules having as training input information relevant to the legal matter in which a witness is testifying); and "class specific" modules (modules trained utilizing, in whole or in part, data from a specific class or classes of litigation, such as patent infringement litigation, tobacco litigation, medical device litigation, securities litigation, antitrust litigation, including subsets of these, among many others).

Said modules utilize various categories of data and subsets of that data to train the system to identify documents that are more likely to be of use as a potential exhibit or reference point during a legal proceeding, such as a deposition or a trial. Several applicable categories of data that may be utilized by the system, which are relevant to legal matters are identified in FIG. 3 and FIG. 4, and include various classes of evidence produced between the parties, written discovery requests and information and documents produced in response to such requests, internal work product generated by a party, and documents filed with or orders generated by the court (as examples).

In an embodiment, the system is configured such that a user of the system may make accessible to the system any of the exemplar documents and data in FIG. 3 and FIG. 4 (as examples), including, inter alia, though bulk uploads to the system, drag and drop methods, and may identify for the system the nature of the data or documents made accessible to the system, such that the document type may be used as a factor in training the system.

Case Law as Input to DK Training Module.

The system can be trained utilizing case law (legal opinions, orders, standing orders, rules and the like) relevant to that particular class of cases. In some implementations, the system utilizes content from or derived from one or more court opinions that relate to a current litigation matter, either because that matter relates to the same or similar case type, is an opinion rendered by the same court or judge in which your current matter is pending, or addresses matters of fact or law that are relevant to your case.

For example, in the context of a patent infringement case before a judge in a federal district court in Texas or Delaware or California, the system may utilize as input decisions in other patent infringement cases in Texas or Delaware or California, for example, decisions rendered in the same district court, and/or before the same district judge. In certain implementations, by way of example and not of limitation, the input can utilize current opinions over older opinions, and opinions that have been affirmed vs. Opinions that have been overturned on appeal or remanded. In other embodiments, the decisions of appellate courts involving the same case type are utilized as training input into the system, such as in the context of patent infringement cases, the Court of Appeals for the Federal Circuit.

Evidentiary Legal Documents as Training Input to DK Modules.

Evidentiary documents and data (such as discovery exchanged between the parties in the form of documents and things) may be utilized as training input. Beyond that, content from other types of discovery may also be used, including answers to interrogatories, admissions, testimony from depositions in the same matter, etc., can be similarly used.

Non-Evidentiary Legal Documents as Training Input to DK Modules.

A feature described utilizes the content of one or more non-evidentiary legal documents relevant to a specific case, including documents of documents filed with a court in conjunction with one or more legal proceedings as an input into a system and method for identifying one or more documents among a plurality of documents stored in a remote eDiscovery database, said input including, inter alia, pleadings, including complaints and answers, corporate disclosure statements, stipulations, notices, motions, replies, responses. The features may further or separately utilize legal documents not filed with a court, but exchanged between one or more parties, such as formal discovery requests (Requests to produce documents, interrogatories, requests to admit and the like, as well as documents in response to those requests (e.g., objections, admissions, answers to interrogatories, etc.) (see "evidentiary documents, below).

Testimony as a Training Input to DK Training Modules.

The feature may separately utilize deposition testimony in a current case or past cases as a training input. In one embodiment, the training system utilizes content, such as transcription content from a past deposition or trial. Portions of that transcription, and in some embodiments, substantially all of the portions of one or more transcriptions of depositions or testimony (however parsed), may be utilized as input into a search process to identify relevant document or data. The data and documents identified by this search process may be tagged or noted by the system as being potentially relevant. In some instances, the same data and documents may be identified multiple times as having been relevant or potentially relevant to multiple portions of a transcript. The identification, repeat identification or non-identification of documents may then be used as a training input into the system. In an embodiment, and instead of or in addition to one or more segments of parsed testimony being used as the input, other documents may be used as an input to searches of relevant or potentially relevant documents, with the collective results used as input into the system.

Work Product as Training Input to DK Modules

The feature may separately utilize the content of attorney work product, emails between members of a case team, and memoranda. For example, the training data can include memos created by the litigation team that identify case themes or legal issues that they anticipate will be important in this case. Furthermore, if used early in the litigation life cycle, the system can continue learning as the legal issues and case themes develop throughout the case. By way of example, the system can monitor the emails or other collaboration channels of the litigation team and identify themes (e.g., words, topics, concepts) that occur more often than others, thus identifying those as important. Based on that evolving knowledge, the system can then continually search and surface documents and other evidence available to the litigation team as the case progresses.

Utilizing Subsets of Documents and Data within a Larger Subset of Documents (e.g., an eDiscovery Database) to Train the System.

With reference to the figure below, the system can utilize information from prior cases to improve the predictive algorithms of the present system for use in a currently pending case. For example, the system can train a "Class Specific" Training Module, such as a Patent Litigation training module, using a training set of data from past intellectual property litigation matters. In the context of an IP case, the system can be supplied with a plurality of documents, and information relevant to sub-sets of that data can inform the system, such that the system becomes trained in reference to documents that have proven useful in prior IP cases. Such documents and their companion algorithms will have different predictive characteristics than those other "Class Specific" modules that have learned using data sourced from other classes of cases, such as mass tort cases, securities litigation, contract litigation, and the like.

In one embodiment, the system can be trained with multiple layers of knowledge to customize its knowledge to the attorney using the system. For example, if the attorney is a patent litigator who handles medical device litigation, the system can be trained using (a) the legal terminology pertaining to litigation in general (e.g., witness, deposition, trial exhibit, etc.); (b) the specific area of law, namely patent litigation, in this example; and (c) the case area domain, namely medical devices in this example. [See FIG. 5]. Trained on these particular features of the litigation type handled by the user, the system can also/further be trained on the issues particular to a specific case. For example, the system can use a subset of the case documents and associated metadata as the training set. Alternatively and/or in conjunction, the system can also use the names of the people involved (e.g., potential witnesses) by party as the training set. Another training set can be a list of issues identified in the case assessment stage of the litigation. If the attorney is handling three different medical device patent litigation cases, each case will have its own set of parties, people, issues, and facts, but the underlying medical device knowledge will be common to all three cases, as will be the patent law knowledge, and the general litigation knowledge.

Generating Query Parameters without Additional User Input

In certain implementations, the system and method can be configured to utilize segments of a document or transcript ("Content Segments") as input into a search of a database containing a plurality of documents that may or may not be related to the Content Segment. The system may be configured to do this independently, without a user serially identifying specific Content Segments. Any type of search may be utilized (keywords, term, concept/semantic/fuzzy logic, etc.). Content Segments may be of any length (a sentence, phrase, paragraph, sections, etc.). The resulting document "hits" based on the search type can be then ranked based on "how related" that document is to the Content Segment. In certain implementations, the system may be configured to utilize the same Content Segment as input into multiple search types.

Take for example, a Content Segment from a deposition transcript that is comprised of the phrase: "I talked to Milena about the novel applications of machine learning." Utilizing that Content Segment as input into a query of an eDiscovery database, identified documents may include: documents authored by individuals named "Milena,"; documents discussing "machine learning," documents mentioning a "novel" (a book) or things that are "novel" (i.e., unique); or job "applications" and/or documents that are highly relevant because they contain content relevant to multiple aspects of this Content Segment, such as an email from Milena attaching a job application for a candidate for a machine learning position. All documents, or some subset of documents that are more highly relevant that others, can then be tagged as having been responsive to a particular Content Segment. The system can be configured to serially analyze subsequent Content Segments, tagging those responsive documents, and so on, proceeding through all or a designated portion of Content Segments in a deposition and identifying documents related thereto based on the type of search utilized. In the context of a large eDiscovery database containing 1 million+ documents, some subset of which have been tagged repeatedly as being relevant to various Content Segments, certain documents will be identified far more frequently than others because they have aggregated more "tags" "hits" or equivalents, essentially as they have been identified as being potentially relevant to more Content Segments. Such documents can be displayed or listed to a user of the system for review and potential use, e.g., as exhibits during a deposition or at trial or as appended to motions before a court, such as a summary judgment motions. Such documents can undergo further analysis and utilized as a training input for the system.

Content Segments can be obtained from other classes of documents, as well, such as the legal documents and information listed in FIG. 3. By way of example, Content Segments from a Rule 30(b)(6) notice (or a designated portion of a such a notice (e.g., the noticed topics of a deposition)), may be utilized to perform searches on documents stored in a database. In certain implementations, eDiscovery documents that are identified as relevant to the Content Segments are tagged. The same process can be utilized to intake content from other types of documents (FIG. 3), utilize a Content Segment or series of Content Segments from that legal document (or portion thereof), and perform searches using that Content Segment, "tagging" or otherwise identifying that subset of the documents in a database that are relevant.

In this manner, the system can be configured to utilize a wide range of legal documents, or selected content (Content Segments) from those legal documents, as input into database queries, and track which documents have been identified as relevant to any particular Content Segment and/or relevant to all Content Segments as a whole, or relevant to one or more types of Content Segments sourced from particular classes of documents (e.g., only depositions; or only defendant depositions; or only depositions and court orders; or depositions and work product memos and motions to compel, as examples). In certain implementations, the system can "rank" documents using a document ranking engine, which can rank and re-rank documents based on a user's preferred criteria (e.g., all things equal, documents tagged as relevant to Content Segments sourced from a motion to compel being "more" relevant than a document tagged as relevant to Content Segments sourced from 3rd party deposition transcripts).

In certain implementations, the system may utilize the information from tagged documents as feedback to the system, and human feedback regarding the relevance of documents so tagged and ranked may be used to further train the system.

System Implementation

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them. The data processing apparatus can be implemented at least in part on a quantum computing platform that includes quantum computing hardware, software, and firmware.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are shown in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes shown in the accompanying figures do not necessarily require the particular order shown, or sequential order, to achieve desirable results. In some cases, multitasking and parallel processing may be advantageous.

What is claimed is:

1. A method for performing document search and ranking, the method being implemented by a computer, the method comprising:
    obtaining a transcript of a legal interaction that includes a trial or a deposition, and displaying the transcript via a user interface;
    generating a query parameter based on at least the transcript, and transmitting the query parameter to a database search engine;
    receiving a list of documents retrieved by the database search engine corresponding to the query parameter;
    for each respective document in the list of documents, processing an input comprising (i) document information of the respective document and (ii) contextual information of the legal interaction using a feature extraction machine learning model to generate a respective feature representation; and
    processing the feature representations of the list of documents to generate a ranking result.

2. The method of claim 1, wherein obtaining the transcript during the legal interaction, and displaying the transcript via the user interface comprises:
    obtaining the transcript based on an audio signal obtained during the legal interaction in real time; and
    displaying the transcript via the user interface during the legal interaction in real time.

3. The method of claim 2, wherein obtaining the transcript based on a speech made during the legal interaction in real time comprises:
    performing a speech-to-text conversion to generate the transcript from the audio signal.

4. The method of claim 1, wherein generating the query parameter based on the transcript comprises:
    receiving, from the user interface, a first user input that indicates a transcript element in the transcript; and
    generating the query parameter based on the transcript element in the transcript.

5. The method of claim 4, wherein the transcript element includes a keyword.

6. The method of claim 4, wherein:
    the transcript element specifies a specified portion of the transcript.

7. The method of claim 6, further comprising:
    displaying the transcript element;
    receiving a second user input that indicates modifications to the transcript element; and
    modifying the transcript element based on the second user input.

8. The method of claim 1, wherein generating the query parameter based on the transcript comprises:
    processing a first input including at least a portion of the transcript using a first query machine learning model to generate the query parameter.

9. The method of claim 8, wherein:
    the method further comprises obtaining the contextual information of the legal interaction; and
    the first input to the query machine learning model further includes the contextual information.

10. The method of claim 9, wherein the contextual information of the legal interaction includes:
    an intended target of a testimony;
    deponent information;
    case type information of the legal interaction; or
    judge information of the legal interaction.

11. The method of claim 9, wherein generating the query parameter based on the transcript comprises:
    generating the query parameter without using any user inputs that indicate keywords.

12. The method of claim 1, wherein the document information includes:
    a file type of the document, metadata associated with the file type, a file size of the document, image data in the document, audio data in the document, a ratio of image data to text in the document, a page number of the document, text conversion quality in the document, a scan resolution of the document, a document age of the document, a document source of the document, or whether the document was involved in prior litigation.

13. The method of claim 1, wherein processing the feature representations of the list of documents to generate a ranking result comprises:
    generating a respective ranking score for each of the list of the documents; and
    ranking the list of documents according to the respective ranking scores of the list of documents.

14. The method of claim 1, wherein processing the feature representations of the list of documents to generate a ranking result comprises:
    defining a finite set of relevancy categories; and
    assigning each document into one of the set of relevancy categories.

15. The method of claim 1, wherein processing the feature representations of the list of documents to generate a ranking result comprises:
processing an input including one of the feature representations using a ranking machine learning model to generate a portion of the ranking result.

16. The method of claim 15, wherein the feature extraction machine learning model and the ranking machine learning model have been jointly trained.

17. The method of claim 15, wherein the ranking machine learning model includes a set of category-specific machine learning models, and processing the input to generate a portion of the ranking result comprises:
determining a category of the document;
selecting one of the set category-specific machine learning models according to the determined category of the document; and
processing the input including the feature representation of the document using the selected category-specific machine learning model to generate the portion of the ranking result.

18. The method of claim 1, further comprising:
obtaining training data; and
performing training to update model parameters of a machine learning model.

19. The method of claim 18, wherein the machine learning model comprises:
a query machine learning model for processing a first input to generate the query parameter;
the feature extraction machine learning model for processing a second input to generate the feature representation for each document in the list of documents; or
a ranking machine learning model for processing a third input to generate a portion of the ranking result.

20. The method of claim 19, wherein obtaining the training data comprises obtaining a plurality of training examples based on:
data indicating contents in a court opinion;
court filings by a party;
an evidentiary legal document;
a non-evidentiary legal document;
a testimony document;
a work product; or
data associated with related cases.

21. The method of claim 20, wherein:
performing training to update the model parameters of the machine learning model comprises:
performing end-to-end training of the query machine learning model, the feature extraction machine learning model, and the ranking machine learning model on the training data.

22. The method claim 20, wherein:
the training data includes a set of query training examples, each query training example comprising a training input transcript and an output label including query parameter; and
performing training to update model parameters of the machine learning model comprises:
performing training of the query machine learning model on the query training examples.

23. The method of claim 22, wherein obtaining the training data comprises:
generating the query training examples based on a user input indicating keywords of the training input transcript.

24. A system comprising:
a computer; and
a storage device storing instructions that when executed by the computer, causes the computer to perform operations comprising:
obtaining a transcript of a legal interaction that includes a trial or a deposition, and displaying the transcript via a user interface;
generating a query parameter based on at least the transcript, and transmitting the query parameter to a database search engine;
receiving a list of documents retrieved by the database search engine corresponding to the query parameter;
for each respective document in the list of documents, processing an input comprising (i) document information of the respective document and (ii) contextual information of the legal interaction using a feature extraction machine learning model to generate a respective feature representation; and
processing the feature representations of the list of documents to generate a ranking result.

25. A computer-readable storage medium storing instructions that, when executed by a computer, causes the computer to perform operations comprising:
obtaining a transcript of a legal interaction that includes a trial or a deposition, and displaying the transcript via a user interface;
generating a query parameter based on at least the transcript, and transmitting the query parameter to a database search engine;
receiving a list of documents retrieved by the database search engine corresponding to the query parameter;
for each respective document in the list of documents, processing an input comprising (i) document information of the respective document and (ii) contextual information of the legal interaction using a feature extraction machine learning model to generate a respective feature representation; and
processing the feature representations of the list of documents to generate a ranking result.

* * * * *